United States Patent [19]

Henson et al.

[11] Patent Number: 4,907,720
[45] Date of Patent: Mar. 13, 1990

[54] METHOD AND APPARATUS FOR UNIFORMLY DISPENSING A SEASONING MATERIAL

[75] Inventors: James K. Henson, Garland; Wilfred M. Bourg, Jr., Arlington; William D. Henson, Ducanville, all of Tex.

[73] Assignee: Frito-Lay, Inc., Dallas, Tex.

[21] Appl. No.: 49,098

[22] Filed: May 13, 1987

[51] Int. Cl.⁴ .............................................. B67D 5/08
[52] U.S. Cl. ........................................ 222/55; 222/58; 426/289; 118/680; 118/308; 239/659; 239/672
[58] Field of Search .................. 222/1, 55, 56, 52, 57; 426/289, 296; 118/24, 25, 674, 680, 308; 239/672, 674, 659

[56] References Cited

U.S. PATENT DOCUMENTS

| | | |
|---|---|---|
| 25,004 | 4/1912 | May . |
| 44,785 | 12/1864 | Conkling . |
| 52,693 | 2/1866 | Derines . |
| 311,904 | 2/1885 | Lockwood . |
| 499,252 | 6/1893 | Sager . |
| 577,354 | 2/1897 | Callahan . |
| 782,283 | 2/1905 | Simpson . |
| 874,570 | 12/1907 | Cairncross ............................ 118/24 |
| 971,609 | 12/1910 | Hedfeldt . |
| 1,181,208 | 5/1916 | Bremer . |
| 1,537,123 | 5/1925 | Leopold . |
| 1,545,376 | 7/1925 | Weatherby . |
| 1,926,903 | 9/1933 | Kirchhoff . |
| 2,066,899 | 1/1937 | Parsons . |
| 2,142,373 | 1/1939 | Plambeck . |
| 2,323,846 | 7/1943 | Weyandt . |
| 2,390,195 | 12/1945 | Tascher . |
| 2,433,684 | 12/1947 | Damond . |
| 2,583,862 | 1/1952 | Lichtenstein . |
| 2,633,242 | 3/1953 | Rhodes . |
| 2,905,365 | 9/1959 | Thayer et al. . |
| 3,155,277 | 11/1964 | Fath et al. ............................ 222/55 |
| 3,545,281 | 12/1970 | Johnston . |
| 3,817,206 | 6/1974 | Case ................................... 118/24 X |
| 3,822,007 | 7/1974 | Bridge, Jr. ......................... 198/631 |
| 3,874,327 | 4/1975 | Furman ............................ 222/52 X |
| 4,002,773 | 1/1977 | Entenmann . |
| 4,288,314 | 9/1981 | Derderian . |
| 4,578,965 | 4/1986 | Brossman ....................... 118/674 X |
| 4,729,442 | 3/1988 | Sichet ................................... 222/55 |

Primary Examiner—Joseph J. Rolla
Assistant Examiner—Steve Reiss
Attorney, Agent, or Firm—Bernard, Rothwell & Brown

[57] ABSTRACT

A method and apparatus for uniformly dispensing particles of a seasoning material continuously deposits seasoning material at a controlled rate onto a seasoning drop point of an oscillating spreading conveyor. The oscillating spreading conveyor spreads seasoning material in a zig-zag pattern over a receiving area on the top surface of a transfer conveyor, that in turn transfers seasoning to an elongate trough of a seasoning applicator disposed beneath the transfer conveyor. The trough has a screened bottom and includes rotating bars within the trough for fluffing seasoning in the trough and for promoting uniform dispensing of the seasoning through the screened bottom of the trough. The dispensing rate of the seasoning through the screened bottom is controlled by varying the rotational speed of the bars to maintain a desired amount of seasoning material within the trough. A moving product conveyor carries a food product under the seasoning applicator to receive seasoning dispensed through the screened bottom of the seasoning applicator.

12 Claims, 1 Drawing Sheet

U.S. Patent  Mar. 13, 1990  4,907,720
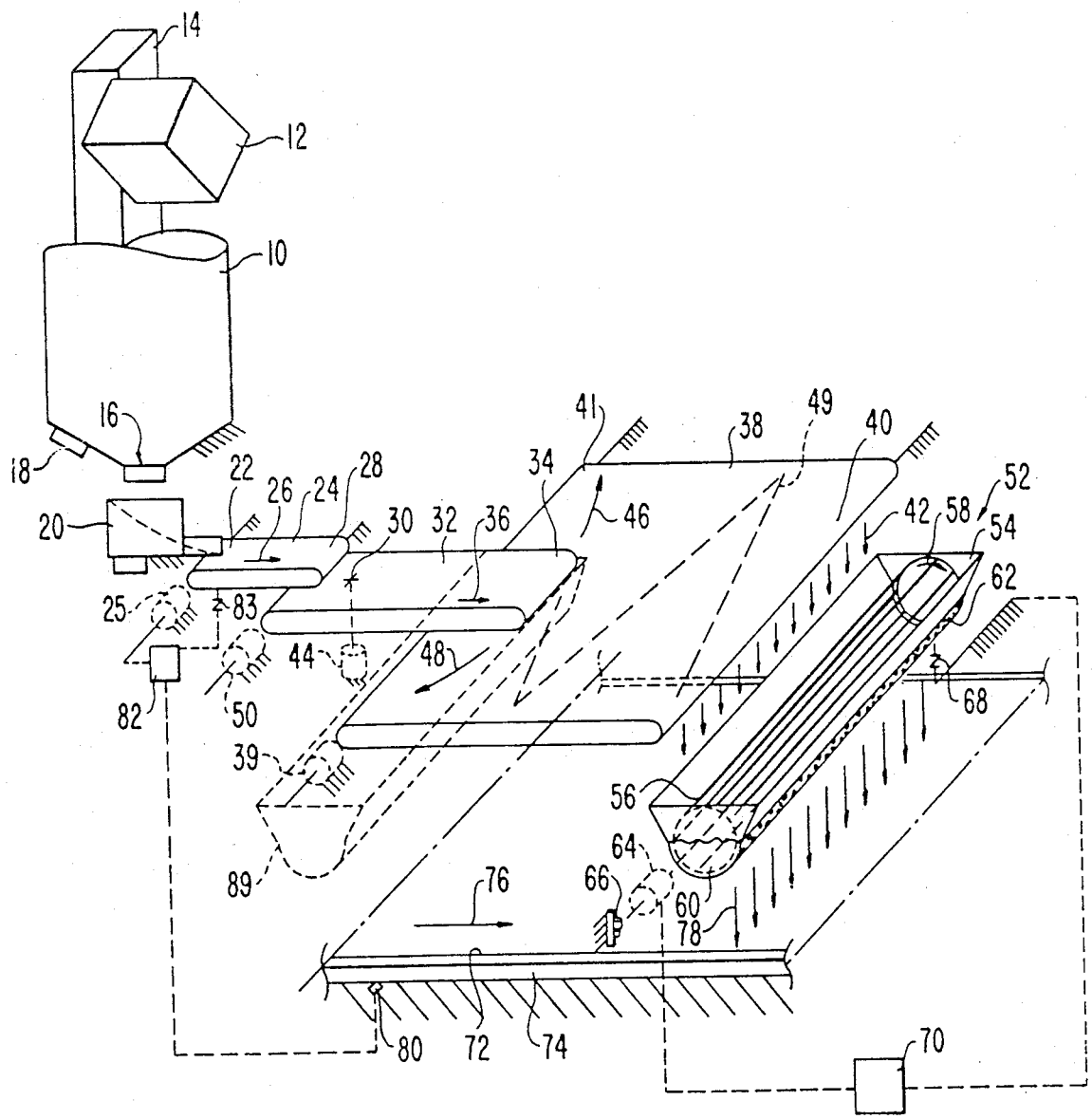

METHOD AND APPARATUS FOR UNIFORMLY DISPENSING A SEASONING MATERIAL

BACKGROUND OF THE INVENTION

1. Field of the Invention

The present invention relates to the field of handling, feeding and dispensing particulate materials.

2. Description of the Background Art

A variety of devices have been proposed for handling and dispensing dry particulate materials, such as flour, sugar and grain. For example, U.S. Pat. No. 2,905,365 discloses a dispenser with a hopper having a vibrating screen therein. U.S. Pat. No. 2,633,242 discloses a flour duster including an outer housing open at the bottom with a perforated screen plate forming the bottom wall of the hopper. U.S. Pat. No. 2,390,195 discloses a flour duster including a curved bottom screen with an agitator bar and rotating brush therein. U.S. Pat. No. 2,323,864 discloses a vibratory feeder including a vibrating hopper and vibrating tray. U.S. Pat. No. 2,066,899 discloses a flour dusting mechanism including a hopper having a perforate bottom and an agitator mechanism. U.S. Pat. No. 1,926,903 discloses a sifter mechanism having a stationary hopper with rocking agitators comprised of longitudinal rods therein. U.S. Pat. No. 1,537,123 discloses a dry feeding machine having a vibrating hopper section with rotating agitator means therein. U.S. Pat. No. 1,181,208 discloses a candy starching device with a vibrating screen sifter and a rotating assembly within the hopper. U.S. Pat. No. 311,904 discloses a grain separator and cleaner with a vibrating screen assembly. U.S. Pat. No. 52,693 discloses a drug and spice sifter including a curved screen and rotating assembly therein, and U.S. Pat. No. 44,785 discloses a plaster and seed sower including a dual-chamber hopper with rotating devices in each chamber.

The above-described devices were intended for use with dry, non-sticky granular and powdered materials such as flour, sugar and grains. Certain seasoning materials which would be desirable to use as topical seasonings sprinkled on snack foods are extremely difficult to handle, feed an apply on an industrial or commercial scale. For example, granular particles formed of seasoning materials having up to 50% fat or more can become very sticky and tend to agglomerate and clog up previously known devices for feeding dry particulate materials such as flour, sugar and grains. Because of this, prior art devices for dispensing non-sticky granular and powdered materials are generally unsuitable for uniformly dispensing high fat content particles that are sticky, and which agglomerate and smear when compacted or worked. As a consequence, snack food manufacturers previously have either had to forego the use of such agglomerable high fat seasoning materials, or put up with non-uniform seasoning of snack food products using prior art dispensers.

Accordingly, there remains a need in the art for a method and apparatus for uniformly dispensing seasoning materials that tend to agglomerate and smear when compacted or worked.

SUMMARY OF THE INVENTION

In accordance with the present invention, an apparatus for uniformly dispensing a seasoning material includes a moving product conveyor for carrying a food product to be seasoned, and a seasoning applicator including an elongate trough with a screened bottom disposed above the moving product conveyor for dispensing seasoning material onto a food product carried on the moving product conveyor. The seasoning applicator includes rotating means within the trough for fluffing seasoning within the trough and for promoting uniform dispensing of seasoning through the screened bottom onto food product carried on the product conveyor. Means are provided for controlling the rotational speed of the rotating means within the trough, to maintain a desired weight of seasoning material within the trough. Above the elongate trough is positioned a first delivery end of a transfer conveyor for depositing seasoning into the elongate trough. The transfer conveyor has a receiving area across a top surface thereof for receiving seasoning material, with the first delivery end of the transfer conveyor which is positioned above the elongate trough being downstream of the receiving area of the transfer conveyor. More particularly, the transfer conveyor is comprised of a first moving conveyor belt for conveying seasoning from the receiving area of the transfer conveyor over the first delivery end of the transfer conveyor into the elongate trough of the seasoning applicator. Seasoning material is delivered to the transfer conveyor by a spreading conveyor having a seasoning drop point thereon for receiving seasoning on a top surface thereof. The spreading conveyor also includes a delivery end downstream of the seasoning drop point. The spreading conveyor is comprised of a second moving conveyor belt for conveying seasoning from the seasoning drop point over the delivery end of the spreading conveyor for spreading seasoning across the receiving area of the previously mentioned transfer conveyor. Means are provided for moving the delivery end of the spreading conveyor above the receiving area of the transfer conveyor to spread seasoning material across the receiving area of the transfer conveyor in a zig-zag pattern. Means are further provided for continuously depositing seasoning material onto the seasoning drop point of the spreading conveyor at a controlled rate. The invention also provides a method for uniformly dispensing particles of seasoning material, in which particles of seasoning material are continuously conveyed to form a substantially constant mass flow of seasoning material that is continuously spread to form a continuously moving array of seasoning material in a zig-zag pattern. The moving array of seasoning material is continuously collected into a substantially stationary elongate mass of seasoning material within which the seasoning material is tumbled to fluff the seasoning material, with the seasoning material being continuously and uniformly dispensed from the elongate mass.

BRIEF DESCRIPTION OF THE DRAWING

The single FIGURE is a perspective, somewhat schematic view of an apparatus for uniformly dispensing a seasoning material in accordance with the present invention.

DETAILED DESCRIPTION OF THE INVENTION

With reference to the drawing, an apparatus for uniformly dispensing particles of seasoning material downstream onto a food product includes a stationary hopper 10 for receiving powdered seasoning materials in bulk. The particulate seasoning material can be granular or powdered, and ma have up to 50% by weight fat or more. Such seasoning materials have a tendency to stick together and agglomerate or smear when compacted or worked. For loading the hopper 10, bulk bins 12 containing, for example, 150 kg (about 300 lbs.) of granular seasoning material, are placed on column lift 14, raised and emptied into hopper 10. Advantageously, before being placed in the hopper 10, the granular, highly agglomerable seasoning material is kept cool using liquid carbon dioxide or the like, to avoid agglomeration of the seasoning particles.

Hopper 10 includes a bottom opening 16 for seasoning to exit the hopper. One or more vibrators 18, one shown in the drawing, are connected to a bottom portion of hopper 10 for vibrating the hopper bottom to prevent bridging of seasoning material in the hopper and to promote seasoning flow through the hopper exit 16. Advantageously, vibrator 18 provides high frequency, low amplitude vibrations.

A prefeeder 20, such as a slide, vibrating pan or the like, is provided for guiding and transferring seasoning material exiting hopper 10 to a receiving end 22 of a variable speed weighbelt 24 that varies in conveying speed depending on the weight of seasoning material present thereon to provide a constant mass flow of seasoning.

A motor 25 drives weighbelt 24 to convey seasoning material in the direction of arrow 26 in a constant mass flow from the receiving end 22 over a delivery end 28 of the weighbelt, which is disposed over a seasoning drop point 30 on a top surface of a spreading conveyor 32. Spreading conveyor 32 includes a delivery end 34 downstream of the seasoning drop point 30, the spreading conveyor being comprised of a conveyor belt, the top surface of which moves in the direction of arrow 36 to convey seasoning from the drop point over the delivery end 34 onto a receiving area of a transfer conveyor 38. In the embodiment shown, the receiving area of the transfer conveyor 38 extends laterally across the top surface of the transfer conveyor, and is longitudinally about centrally located on the top surface of the transfer conveyor.

For spreading the seasoning material over the receiving area on the top surface of transfer conveyor 38, a drive 44 is connected to conveyor 32 for pivoting the spreading conveyor about the seasoning drop point 30 and thereby oscillating the delivery end of the spreading conveyor along the path indicated by arrows 46 and 48 while spreading seasoning material over the receiving area to form a uniform array of seasoning material in a zig-zag pattern 49 on the top surface of the transfer conveyor. The pivot drive 44 establishes a substantially constant velocity profile that minimizes time for deceleration and acceleration thereby providing substantially constant motion and an even distribution of product in a zig-zag pattern. For even distribution of seasoning in accordance with this embodiment, it is important that conveyor 32 pivot about drop point 30. According to one example of this embodiment, the spreading conveyor 32 has a five second cycle of oscillation to spread seasoning material over about a 48-inch width on the top surface of transfer conveyor 38.

In an alternative embodiment, the delivery end 34 of the spreading conveyor 32 is moved above the receiving area of the transfer conveyor by reciprocating the spreading conveyor 32 above the receiving area of the transfer conveyor 38 using any suitable means, to spread seasoning material across the receiving area in a zig-zag pattern.

The transfer conveyor 38 includes a motor 39 driving a moving conveyor belt in the direction of arrow 36 for conveying seasoning from the receiving area of the transfer conveyor over a delivery end 40 of the transfer conveyor as indicated by arrows 42.

Advantageously, pivot drive 44 and belt motors 39 and 50 are variable speed. Once set, however, the oscillating speed of conveyor 32 and the belt speeds of conveyors 32 and 38 generally remain constant during a particular run. After the velocity of conveyors 32 and 38 is set, their interacting relationship provides for accurate spreading of seasoning that is delivered in a constant mass flow.

A seasoning applicator 52 includes a substantially stationary elongate trough 54 that is disposed beneath delivery end 40 of the transfer conveyor 38 for receiving and collecting the zig-zag array of seasoning that is represented by arrows 42 as it falls from the transfer conveyor.

Within trough 54 is a group of connected bars 56 extending along trough 54. The group of bars 56 is rotated in the direction of arrow 58 by means of a drive motor 64 connected to a drive end of trough 54. The bottom of trough 54 is a screen 62 adjacent the periphery of the rotating group of bars 56, the screened bottom of the trough being curved to correspond to the group of rotating bars so that the bars sweep past the screen during rotation. The delivery end 40 of transfer conveyor 38 is positioned to deliver the seasoning material into trough 54 so that the seasoning material falls on upwardly moving bars 56 during rotation of the group of bars as the seasoning material is being collected into an elongate mass. Rotating bars 56 tumble the elongate mass of seasoning material 60 and thereby fluff the seasoning material within the trough 54 and promote uniform and continuous dispensing of seasoning material through the screened bottom 62.

The bar drive motor 64 is a variable speed motor for controlling the rotational speed of the rotating group of bars 56 within trough 54 to vary the dispensing rate of the seasoning through the screened bottom and thereby maintain a desired amount of seasoning material within the trough.

In the embodiment shown, control of the amount of seasoning within trough 54 is accomplished by pivoting the drive end of the trough about a horizontal axis of pivotable support 66, thereby allowing vertical motion of the opposite end of the trough, which is supported on a load cell 68 that senses the weight of the applicator containing seasoning material to thereby determine the weight of seasoning material in the trough. Load cell 68 is connected to drive motor 64 through controller 70, and is set at a desired weight set point such that the speed of the drive motor is varied as a function of seasoning weight in the trough to maintain the weight of seasoning in the trough at a predetermined level and thereby maintain a desired dispensing rate of seasoning through the screened bottom.

During operation, seasoning level can be visually observed within trough 54, as can seasoning build-up on bars 56 that thereby adds dead weight. Seasoning buildup may also be indicated by dispensing surges through the screened bottom 62. Seasoning buildup in applicator 52 can be compensated for without shutting the unit down by adjusting the weight set point to take into account the seasoning dead weight in applicator 52 and thereby maintain substantially uniform seasoning throughput.

Product is seasoned by passing product beneath the screened bottom of seasoning applicator 52. The product, such as uncut cracker dough sheet 72, is supported on a product conveyor 74 moving in the direction of arrow 76. Dough sheet 72 passes below the screened bottom 62 of the seasoning applicator to receive a substantially uniform application of seasoning, represented by arrows 78, dispensed through the screened bottom 62 of the seasoning applicator.

A sensor 80 is provided for measuring the conveying speed of the moving product conveyor 74. Sensor 80 is connected to weighbelt drive motor 25 through controller 82. Also connected to controller 82 is a weight sensor 83 for measuring the amount of seasoning present on weighbelt 24. Weighbelt drive motor 25 is a variable speed motor for varying the conveying speed of weighbelt 24 as a function of the conveying speed of the product conveyor 74 and of the weight of seasoning present on the weightbelt, to provide for the continuous and uniform depositing of seasoning material onto the seasoning drop point 30 of the spreading conveyor 32 at a controlled rate.

According to one embodiment, transfer conveyor 38 is advanced by operation of motor 39 in a forward direction such that seasoning material is conveyed from the receiving area of the transfer conveyor over first delivery end 40 during forward movement of the transfer conveyor, and over a second delivery end 41 during reverse movement of motor 39 and transfer conveyor 38. Advantageously, a second seasoning applicator 84, shown in phantom lines in the drawing, is disposed beneath the second delivery end 41 of the transfer conveyor 38 and above the moving product conveyor 74. According to this embodiment, seasoning applicator 84 is substantially identical to seasoning applicator 52. By simply reversing the direction of drive motor 39 and transfer conveyor 38 therewith, and by activating seasoning applicator 84, product 72 can continue to be seasoned during shutdown of seasoning applicator 52 for cleaning or repair.

As can be seen, the disclosed invention provides a unique means for very accurately metering, screening, dispersing and feeding a particulate seasoning material that tends to smear, stick together and agglomerate when compacted or worked, as heretofore has been practically impossible to handle by mechanical industrial scale feeders. The invention provides a substantially uniform relationship of topping to dough by achieving a constant mass flow of seasoning from the weighbelt to the spreading conveyor, by evenly spreading the product over the transfer conveyor through uniform oscillation of the spreading conveyor, and by maintaining a substantially constant level of seasoning in the screened applicator to provide a substantially constant mass flow of seasoning onto the product.

Since many modifications, variations and changes in detail may be made to the described embodiments, it is intended that all matter in the foregoing description and shown in the accompanying drawing be interpreted as illustrative and not in a limiting sense.

What is claimed is:

1. An apparatus for uniformly dispensing particles of seasoning material onto a food product, comprising:
    (a) a moving product conveyor for carrying a food product to be seasoned;
    (b) a seasoning applicator including an elongate trough disposed above the moving product conveyor for dispensing seasoning material onto food product carried on the moving product conveyor, the trough having a screened bottom, the seasoning applicator including rotating means within the trough for fluffing seasoning within the trough and for promoting uniform dispensing of seasoning through said screened bottom onto food product carried on the product conveyor;
    (c) means for controlling the rotational speed of the rotating means within the trough to maintain a desired weight of seasoning material within the trough;
    (d) a transfer conveyor having a receiving area across a top surface thereof for receiving seasoning material and a first delivery end downstream of the receiving area, the transfer conveyor being comprised of a first moving conveyor belt for conveying seasoning from the receiving area of the transfer conveyor over the first delivery end of the transfer conveyor, the first delivery end of the transfer conveyor being disposed over the elongate trough of the seasoning applicator for depositing seasoning into the elongate trough;
    (e) a spreading conveyor having a seasoning drop point for receiving seasoning on a top surface thereof and a delivery end downstream of the seasoning drop point, the spreading conveyor being comprised of a second moving conveyor belt for conveying seasoning from the seasoning drop point over the delivery end of the spreading conveyor, the delivery end of the spreading conveyor being disposed above the transfer conveyor for spreading seasoning across the receiving area of the transfer conveyor;
    (f) means for moving the delivery end of the spreading conveyor above the receiving area of the transfer conveyor to spread seasoning material across said receiving area in a zig-zag pattern; and
    (g) means for continuously depositing seasoning material onto said seasoning drop point of said spreading conveyor at a controlled rate.

2. The apparatus of claim 1 wherein the means for moving the delivery end of the spreading conveyor is comprised of means for pivoting the spreading conveyor about said seasoning drop point to oscillate the delivery end of the spreading conveyor above the receiving area of the transfer conveyor and thereby spread seasoning material across said receiving area in a zig-zag pattern.

3. The apparatus of claim 2 wherein the pivoting means oscillates the delivery end of the spreading conveyor at a substantially uniform, predetermined velocity.

4. The apparatus of claim 1 wherein the means for depositing the seasoning material onto the drop point of the spreading conveyor includes a weighbelt assembly comprised of a third moving conveyor belt having a receiving end and a delivery end, the third belt conveying seasoning material from the receiving end of the third belt over the delivery end of the third belt, the delivery and of the third belt being disposed over the drop point of the spreading conveyor to deposit seasoning material onto said drop point, the weighbelt assembly further including means for measuring the conveying speed of the moving product conveyor, and means for varying the conveying speed of the third belt as a function of the conveying speed of the product conveyor and for continuously depositing seasoning material onto the seasoning drop point of the spreading conveyor at a controlled rate, the drop point depositing means further including means for delivering seasoning material to the receiving end of the third belt.

5. The apparatus of claim 4 wherein the means for delivering seasoning material to the receiving end of the third belt includes a hopper for receiving seasoning materials in bulk, the hopper having an opening in a bottom portion thereof for seasoning to exit the hopper, means for vibrating the hopper to prevent bridging of seasoning material in the hopper and to promote seasoning flow through the hopper exit, and means for guiding seasoning material exiting the hopper to the receiving end of the third belt.

6. The apparatus of claim 1 wherein the rotating means within said trough includes a rotating group of bars extending along the trough, and wherein the screened bottom of the trough is curved and adjacent the periphery of the rotating group so that the bars sweep past the screen during rotation.

7. The apparatus of claim 1 wherein the means for controlling the rotational speed of the rotating means within the trough is comprised of a variable speed drive motor at one end of the trough connected to the rotating means, a pivotable support at said one end of the trough, and a load cell supporting an opposite end of the trough for determining the weight of seasoning material in the trough and for varying the speed of said drive motor as a function of seasoning weight in the trough to maintain the weight of seasoning in the trough at a predetermined level and thereby maintain a desired dispensing rate of seasoning through the screened bottom.

8. The apparatus of claim 1 wherein the transfer conveyor is capable of forward and reverse movement and includes a second delivery end opposite said first delivery end of the transfer conveyor, such that seasoning material is conveyed from the receiving area over the first delivery end during forward movement of the transfer conveyor and over the second delivery end during reverse movement of the transfer conveyor, the apparatus further including a second seasoning applicator disposed beneath the second delivery end of the transfer conveyor and above said moving product conveyor.

9. A method for uniformly dispensing particles of seasoning material, comprising continuously conveying particles of seasoning material to form a substantially constant mass flow of seasoning material, and continuously spreading the substantially constant mass flow of seasoning material to forma continuously moving array of seasoning material in a zig-zag pattern for depositing downstream onto a food product.

10. The method of claim 9 further including the step of continuously transferring the seasoning material to be continuously conveyed from a stationary bulk accumulation of said material, prior to said continuously conveying particles of seasoning material.

11. A method for uniformly dispensing particles of seasoning material, comprising continuously conveying particles of seasoning material to form a substantially constant mass flow of seasoning material, and continuously spreading the substantially constant mass flow of seasoning material to form a continuously moving array of seasoning material in a zig-zag pattern for depositing downstream onto a food product
wherein the seasoning material is formed into a substantially constant mass flow of seasoning material by varying the conveying speed of the particles of seasoning material depending upon the weight of seasoning material being conveyed.

12. A method for uniformly dispensing particles of seasoning material, comprising continuously conveying particles of seasoning material to form a substantially constant mass flow of seasoning material, and continuously spreading the substantially constant mass flow of seasoning material to form a continuously moving array of seasoning material in a zig-zag pattern for depositing downstream onto a food product and further including the steps of continuously collecting the moving array of seasoning material into a substantially stationary elongate mass of seasoning material, continuously tumbling the seasoning material in the elongate mass to fluff the seasoning material, and continuously and uniformly dispensing seasoning material from the elongate mass of seasoning material.

* * * * *

UNITED STATES PATENT AND TRADEMARK OFFICE
CERTIFICATE OF CORRECTION

PATENT NO. : 4,907,720

DATED : March 13, 1990

INVENTOR(S) : James K. HENSON, Wilfred M. BOURG, Jr. and
William D. HENSON

It is certified that error appears in the above-identified patent and that said Letters Patent is hereby corrected as shown below:

<u>CLAIMS</u>:

Column 8, line 8, "forma" should be -- form a --.

Signed and Sealed this

Eighteenth Day of June, 1991

Attest:

HARRY F. MANBECK, JR.

*Attesting Officer*    Commissioner of Patents and Trademarks